United States Patent [19]
Kosugi et al.

[11] Patent Number: 5,271,026
[45] Date of Patent: Dec. 14, 1993

[54] DISCHARGE EXCITATION GAS LASER DEVICE

[75] Inventors: Naoki Kosugi, Kyoto; Yasuhiro Shimada, Osaka; Hidehito Kawahara, Takatsuki; Tadaaki Miki, Osaka; Mutsumi Mimasu, Takatsuki, all of Japan

[73] Assignee: Matsushita Electric Industrial Co. Ltd., Osaka, Japan

[21] Appl. No.: 809,180

[22] Filed: Dec. 18, 1991

[30] Foreign Application Priority Data

Dec. 27, 1990 [JP] Japan ................... 2-408115
Mar. 20, 1991 [JP] Japan ................... 3-057247

[51] Int. Cl.⁵ .............................. H01S 3/00
[52] U.S. Cl. ........................... 372/38; 372/83; 372/69; 372/37
[58] Field of Search ........... 372/38, 25, 81, 87, 372/29, 32, 69, 83, 37

[56] References Cited

U.S. PATENT DOCUMENTS

| | | | |
|---|---|---|---|
| 3,818,373 | 6/1974 | Chun et al. | 372/38 |
| 4,397,025 | 8/1983 | Kebabian | 372/29 |
| 4,504,951 | 3/1985 | McMahan et al. | 372/38 |
| 4,635,265 | 1/1987 | O'Harra, II | 372/38 |
| 4,763,336 | 8/1988 | Stephens | 372/38 |

FOREIGN PATENT DOCUMENTS 62-219978 9/1987 Japan .
1484931 9/1977 United Kingdom .

OTHER PUBLICATIONS

H. T. W. Tromp, et al. "Bipolar Pulsing Circuits for High Power High Rep Rate Lasers", IEEE jounrnal, copyright 1990.
A. Sylvan, et al, "Compact High Repetition Rate Magnetically Switched Transverse, Electric, Atmospheric $CO_2$ Laser," Review of Scientific Instruments, vol. 61, No. 7, pp. 1821-1824, Jul. 1990.
T. McKee, et al "A High-Power Long Pulse Excimer Laser," IEEE Photonics Technology Letters, vol. 1, No. 3, pp. 59-61, Mar. 1989.

*Primary Examiner*—Léon Scott, Jr.
*Attorney, Agent, or Firm*—Stevens, Davis, Miller & Mosher

[57] ABSTRACT

In a discharge excitation gas laser device such as an excimer laser device provided with laser medium gas and a pair of electrodes opposite to each other in a gas-tight vessel, the laser medium gas is discharge-excited while inverting the polarity of a DC pulse voltage applied to the pair of electrodes opposite to each other for every pulse. In this way distribution of atoms and ions constituting the laser medium gas in the discharge region including the neighborhood of the main electrodes is made uniform even at a high repetition rate oscillation. Thus it is possible to realize a discharge excitation gas laser device having a good stability of DC pulse discharge without increasing unnecessarily the flow speed of the laser medium gas and no lowering in the pulse energy owing to a high efficiency operation.

10 Claims, 12 Drawing Sheets

DISCHARGE EXCITATION GAS LASER DEVICE

BACKGROUND OF THE INVENTION

The present invention relates to a discharge excitation gas laser device used in the industrial field.

In recent years attention is paid to excimer lasers as new laser light sources for industrial use. An excimer laser is one of ultraviolet lasers, by which oscillation lines can be obtained at wavelengths from 353 nm to 193 nm by combining a rare gas such as krypton, xenon, etc. with a halogen gas such as fluorine, chlorine, etc. for a laser medium gas. Since it is laser medium ga possible to obtain a high output for a short wavelength region by using an excimer laser with respect to conventional laser device, it is expected to be used as a new light source in various fields such as industry, medical service, etc. In particular, in steps of fabricating conductor devices, demand therefor is rising rapidly to serve as a light source for replacing mercury lamps in fabricating super LSIS. Excimer laser devices can be classified, depending on the method for exciting the laser medium gas, into discharge excitating type, electron beam excitation type, X-ray excitation type, microwave excitation type, etc. Among them, discharge excitation type excimer laser devices are used often in the industrial field due to the fact that the construction thereof is simple, that a high repetition rate is possible and that the size thereof can be easily reduced.

Hereinbelow a prior art discharge excitation gas laser device will be explained.

FIG. 15 is a diagram indicating schematically the construction of a prior art discharge excitation high repetition rate excimer laser device. In FIG. 15, reference numeral 1 is a gas-tight vessel; 2a and 2b are a pair of main electrodes; 3 is a peaking condenser; 4 is a preionization gas; 9 is a ventilation fan; and 10 is a heat exchanger, these constituting a laser oscillation tube. Laser medium gas 11 is enclosed in the gas-tight vessel 1. A secondary circuit composed of the peaking condenser 3, the preionization gap 4 and the main electrodes 2a, 2b is connected with a primary circuit composed of a switch 6 consisting of a thyratron, etc., a charging condenser 5, a charging inductor 8 and a DC high voltage power supply 7 at points A and A'. 12 is an arrow indicating transfer current; 13 is an arrow indicating the direction of rotation of the ventilation fan 9; 14 is an arrow indicating gas flow generated by the ventilation fan 9; and 15 shows a discharge region.

Now the operation of the discharge excitation high repetition rate excimer laser device constructed as described above will be explained. At first, electric charge is stored in the charging condenser 5 by the DC high voltage power supply 7. The switch 6 is closed at a point of time where a predetermined amount of electric charge is stored in the charging condenser 5 and the potential difference between the two terminals thereof arrives at a certain value. When the switch 6 is closed, the potential at the point A increases in the negative direction with respect to the potential at the point A'. As the potential at the point A increases in the negative direction, dielectric breakdown is produced at the preionization gas 4. In this way preionization is produced between one of the main electrodes 2a and the other main electrode 2b. At the same time the transfer current 12 flows in the direction indicated by the arrow from the charging condenser 5 and electric charge is transferred to the peaking condenser 3. As electric charge is transferred to the peaking condenser 3, the potential difference between the main electrodes 2a and 2b increases. When it arrives at the discharge starting voltage, a DC pulse discharge is generated between the one main electrode 2a and the other main electrode 2b. Thus electric energy transferred to the peaking condenser 3 is injected in the discharge region 15. In this way the laser medium gas 11 in the discharge region 15 is excited in a high energy state by this DC pulse discharge so that a so-called inverted distribution is established. Energy thus stored in the laser medium gas 11 is outputted in the form of a laser beam by an optical resonator (not shown in the figure). In order to have a sustained laser beam suitable for a purpose of working, etc., a series of the operations described above may be effected with a high repetition rate.

However, since the laser medium gas 11 in the discharge region 15 is deteriorated gradually by the laser exciting discharge and thus discharge characteristics are worsened, the succeeding DC pulse discharge is unstable and no proper laser output can not be obtained, until the laser medium gas 11 between the main electrodes 2a and 2b is replaced by fresh gas by diffusion.

Consequently the ventilation fan 9 and the heat exchanger 10 are disposed in the gas-tight vessel 1 in a prior art device so as to form the gas flow 14 in the gas-tight vessel 1 by rotating the ventilation fan 9 in the direction of rotation 13 indicated by the arrow. The laser oscillation is produced with a high repetition rate, in order to take out a sustained laser beam, by replacing the laser medium gas 11 between the one main electrode 2a and the other main electrode 2b by fresh gas and by cooling and regenerating it.

However, the prior art construction described above had a problem that boundary layers are formed in the neighborhood of the surfaces of the one main electrode 2a and the other main electrode 2b and thus no satisfactory flow speed can be secured, even if the flow speed of the laser medium gas 11 between the main electrodes 2a and 2b in FIG. 15 is increased.

FIG. 16 is a schematical diagram for explaining the aspect of the formation of the boundary layers. In FIG. 16, hatched regions represent the boundary layers 16. Further FIG. 17 is a graph indicating an example of the distribution of the flow speed on a transversal cross-section of FIG. 16 along a line indicated by B—B'. As indicated in FIG. 17, the flow speed is lower in the neighborhood of the surfaces of the one main electrode 2a and the other main electrode 2b than in the central portion. Because of this phenomenon, among positive and negative ions generated by the laser excitation discharge positive ions are attracted by the cathode, while negative ions are attracted by the anode. That is, since the boundary layers 16 are formed in the neighborhood of the surfaces of the one main electrode 2a and the other main electrode 2b and the flow speed is low there, when the repetition frequency is high, the succeeding laser excitation discharge is started, before the laser medium gas 11 in the neighborhood of the surfaces of the one main electrode 2a and the other main electrode 2b is replaced completely by fresh gas. Therefore atoms, which are apt to be positively ionized, are distributed with a relatively high concentration in the neighborhood of the cathode, while atoms, which are apt to be negatively ionized, are distributed similarly in the neighborhood of the anode. Now this phenomenon is considered, taking a kripton fluoride (KrF) excimer laser as an example. Rare gas such as kripton, helium, etc., which is apt to be ionized positively, is distributed so as to have a great concentration gradient in the neighborhood of the cathode, i.e. the main electrode 2b, while fluorine, which is apt to be ionized negatively, is distributed similarly in the neighborhood of the anode, i.e. the main electrode 2a. As a result, the laser medium gas 11 between the main electrodes 2a and 2b is no more uniform and the uniformity of the laser excitation discharge is impaired. Therefore the excitation efficiency is lowered and the pulse energy of the laser beam is decreased. This means that at a high repetition rate oscillation the energy injected in the discharge region 15 should be increased, if it is desired to have a same pulse energy. However, when the energy density injected in the discharge region 15 is increased, deterioration of the laser medium gas 11 is remarkably accelerated. Further, for a discharge excitation high repetition rate excimer laser, stable glow discharge by DC pulse discharge is inevitable and such a high energy discharge causes ion bombardment on the one main electrode 2a and the other main electrode 2b. As described above, in a KrF laser there exist at a relatively high concentration of fluorine in the neighborhood of the surface of the one main electrode 2a serving as the anode and rare gas such as kripton, etc. in the neighborhood of the other main electrode 2b serving as the cathode. Consequently, when laser excitation discharge is generated, a number of fluorine ions collide with the anode 2a. Since fluorine is extremely reactive, in a state where fluorine ions are implanted in the one main electrode 2a, they react with metal constituting the surface of the electrode, e.g. nickel, which produces metal fluoride such as nickel fluoride, etc. The surface of the one main electrode 2a is locally protruded convexly by this metal fluoride. On the other hand, although rare gas colliding with the other main electrode 2b is scarcely reactive, since it sputters the surface of the electrode even at a kinetic energy as low as the laser excitation discharge energy, the surface of the other main electrode becomes concave. If the surfaces of the one main electrode 2a and the other main electrode 2b are locally deformed, the uniformity of the electric field is disturbed, which causes local concentration of the discharge. For this reason, not only the spatial uniformity of the laser beam is worsened, but also the life of the main electrodes 2a and 2b is remarkably shortened.

Consequently, in conventional devices, in order to be able to produce a high repetition rate oscillation, a measure is taken, by which the laser medium gas 11 is circulated with an extremely high speed. However, since influences of the boundary layers increase more and more so that they cannot be neglected, as the flow speed of the laser medium gas 11 increases, the necessary flow speed increase exponentially with increasing repetition frequency. As the result, the size of the ventilation fan 9 increases so that it occupies the major part of the laser device both spatially and on the electric power consumption.

SUMMARY OF THE INVENTION

The present invention has been developed in order to solve the problem described above of the prior art technique and and object thereof is to provide a discharge excitation gas laser device, which has excellent output stability, even at a high repetition rate oscillation an has a high efficiency, a long life, a small size and a small weight.

In order to achieve this object, the discharge excitation gas laser device according to the present invention is provided with laser medium and a pair of electrodes in a gas-tight vessel and has a construction, in which the polarity of the DC pulse applied to this pair of electrodes is inverted to excite the laser medium by discharge.

Owing to this construction, the distribution of atoms and ions constituting the laser medium in the discharge region, including the neighborhood of the main electrodes, is made uniform even at the high repetition rate oscillation. Consequently, without unnecessarily increasing the flow speed of the laser medium gas, the stability of the DC pulse discharge at the high repetition rate oscillation is improved, reduction in the pulse energy is avoided because of high efficiency operation, and the life of the laser medium gas is elongated. Further, since unequal impairment of the main electrodes is removed, the life of the whole device is elongated. Furthermore, since a small size ventilation device is sufficient for circulating the laser medium gas, it is possible to realize a discharge excitation gas laser, which is not only small and light but also of small electric power consumption.

DESCRIPTION OF THE PREFERRED EMBODIMENTS

Figure 1:
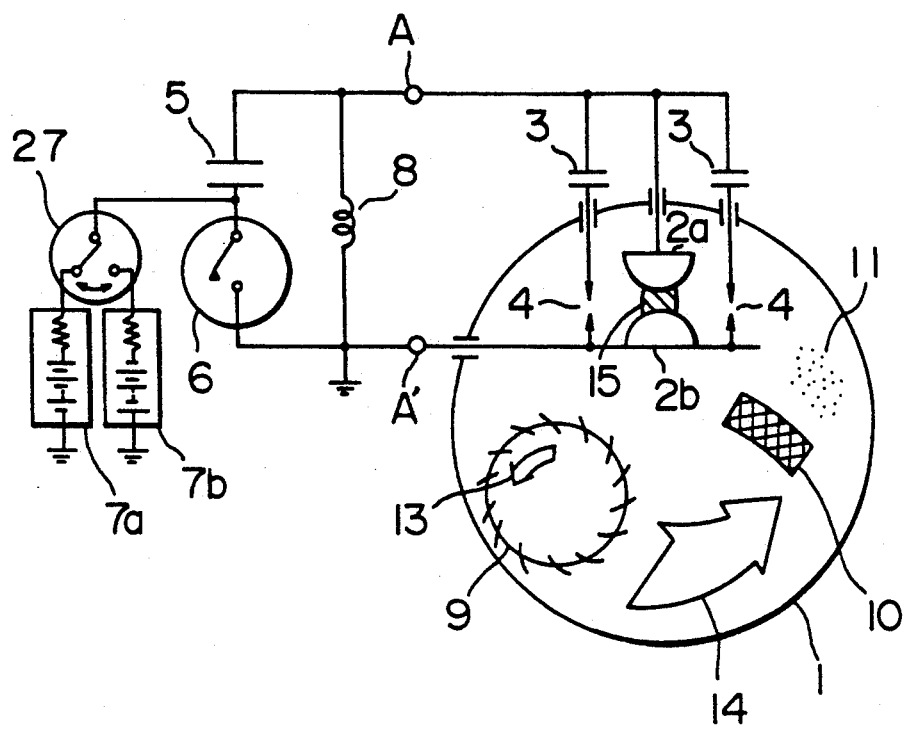
FIG. 1 is a diagram indicating schematically the construction of a discharge excitation high repetition rate excimer laser device used in a first embodiment of the present invention.
Figure 15:
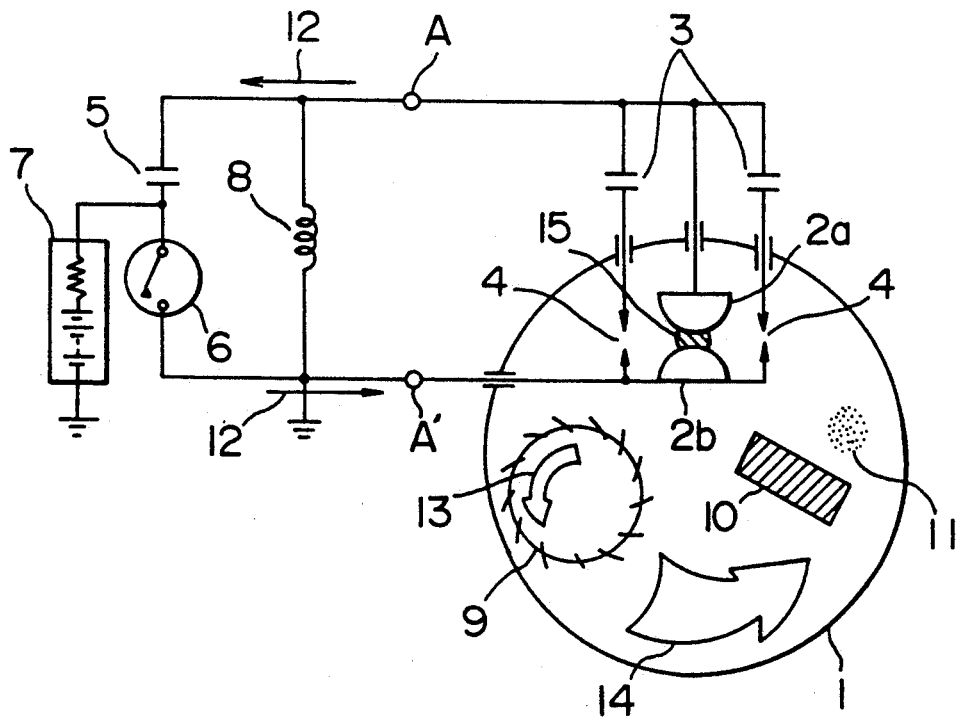
FIG. 15 is a diagram indicating schematically the construction of a prior art discharge excitation high repetition rate excimer laser device.
Figure 16:
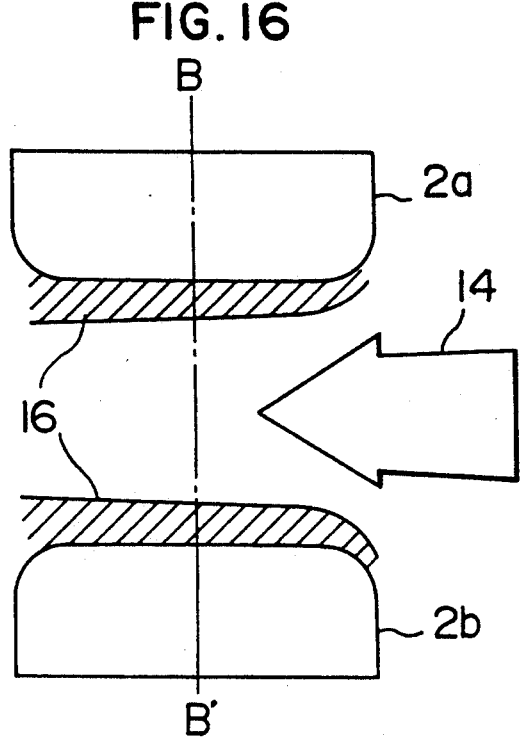
FIG. 16 is a schematical diagram for explaining the aspect of formation of boundary layers.
Figure 17:
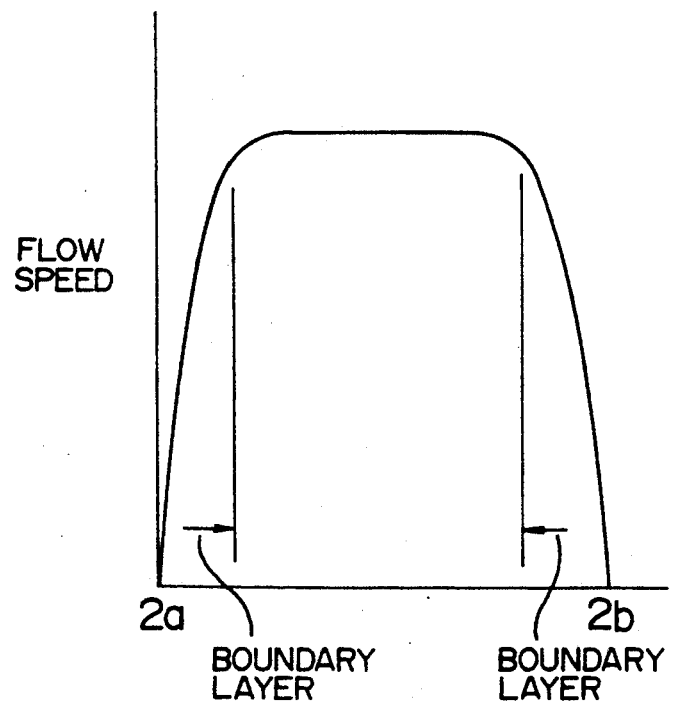
FIG. 17 shows a curve representing an example of the flow speed distribution on a transversal cross-section along a line B—B' in FIG. 16.

FIG. 1 is a diagram indicating schematically the construction of a discharge excitation high repetition rate excimer laser device used in the first embodiment of the present invention. In FIG. 1, the parts corresponding to the constituent elements in the prior art example indicated in FIG. 15 are indicated by the same reference numerals and explanation thereof will be omitted and only the parts, which are features of the present embodiment, will be explained. In FIG. 1, reference numeral 7a is a positive high voltage power supply; 7b is a negative high voltage power supply; and 27 is a high voltage switch switching-over the DC high voltage power supplies 7a and 7b. Further a series of operations from a step in which the charging condenser 5 is charged with electric charge up to a step just before the charging condenser 5 is charged again with electric charge after it has been consumed by the laser oscillation, is called one cycle.

At first, it is supposed that the high voltage switch 27 is connected with the side of the positive DC high voltage power supply 7a in a certain cycle J. At this time, the electrical operation of the discharge excitation high repetition rate excimer laser device in the present embodiment is identical to the operation of the prior art example indicated in FIG. 15. That is, when the switch 6 is closed at the point of time where the charging of the charging condenser 5 has been terminated, electric charge is transferred from the charging condenser 5 to the peaking condenser 3. Together therewith, the potential at the point A increases in the negative direction with respect to the potential at the point A'. Finally a DC pulse discharge is produced, for which the one main electrode 2a serves as the cathode, while the other main electrode 2b serves as the anode. The laser medium gas 11 in the discharge region 15 is discharge-excited, which gives rise to the laser oscillation.

In the succeeding cycle (J+1) the high voltage switch 27 is switched-over to the side of the negative DC high voltage power supply 7b. Consequently, in this cycle (J+I), the charging condenser 5 is negatively charged with respect to the potential at the point A'. When the switch 6 is closed at the point of time where the charging of the charging condenser 5 has been terminated, electric charge is transferred from the charging condenser 5 to the peaking condenser 3. Together therewith, the potential at the point A increases in the positive direction with respect to the potential at the point A'. Finally a DC pulse discharge is produced, for which the one main electrode 2a serves as the anode, while the other main electrode 2b serves as the cathode. The laser medium gas 11 in the discharge region 15 is discharge-excited, which gives rise to the laser oscillation.

As described above, in the first embodiment, the polarity of the one main electrode 2a and the other main electrode 2b isoinverted alternately for every cycle to give rise to repeated oscillation. This is considered, taking a KrF excimer laser as an example. In the cycle J, rare gas atoms such as kripton, which are apt to be positively ionized, are attracted to the neighborhood of the surface of the one main electrode 2a. on the contrary, in the succeeding cycle (J+1), since the main electrode 2a acts as the anode, fluorine atoms, which are apt to be negatively ionized, are attracted and the rare gas atoms are repulsed. On the other hand, a process, which is inverse to the process in the neighborhood of the surface of the one main electrode 2a, takes place in the neighborhood of the surface of the other main electrode 2b. Since the operations described above are repeated alternatively, the distribution of atoms and ions constituting the laser medium gas 11 in the discharge region 15 including the neighborhood of the pair of main electrodes 2a and 2b becomes uniform.

As the result, the laser medium gas 11 in the discharge region 15 can be completely replaced by fresh gas without using a flow speed of the laser medium gas 11, which is as high as that used in the conventional high repetition rate excimer laser device. Therefore the DC pulse discharge is stable and the output of the laser beam doesn't decrease even at high repetition rate oscillation. This means that a small quantity of energy necessary for obtaining a same laser beam output may be sufficient. Since it is possible to suppress deterioration of the laser medium gas 11, due to the fact that surplus energy is emitted to the discharge region 15, to the minimum value, remarkable improvement in the effect can be obtained both on the efficiency and on the deterioration of the laser-medium gas 11. In addition, since the polarity of the main electrodes 2a and 2b is inverted for every cycle, the deterioration of the surfaces of the main electrodes due to ion bombardment is equal to each other for the main electrodes 2a and 2b. In this way, since local concentration of the discharge is alleviated, not only the spatial uniformity of the output laser beam is improved, but also the life the main electrodes is remarkably elongated.

Furthermore, since the flow speed of the laser medium gas 11 is not necessarily as high as that used in the conventional device, it is possible to seduce the size of the ventilation fan 9 and the amount of electric power for driving it. Thus, it is also possible for the whole device to realize a discharge excitation high repetition rate excimer laser device having a small size and a small electric power consumption.

Figure 2:
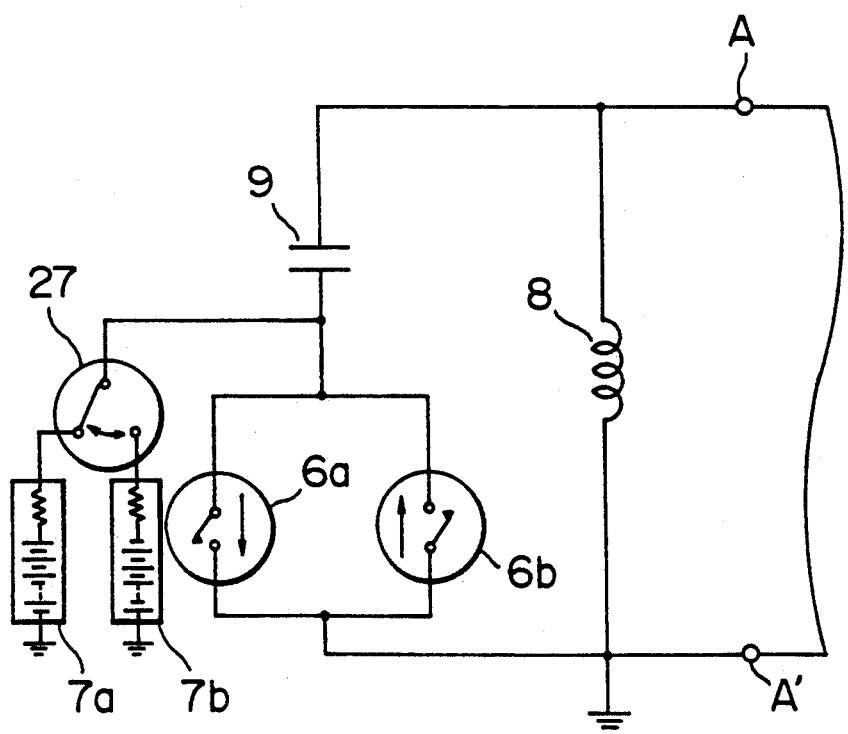
FIG. 2 is a circuit diagram of the principal part of the same excimer laser device using a directional switch.

A bidirectional switch (e.g. spark gap) is required for the switch 6 in FIG. 1. Now an embodiment, in which uni-directional switches such as, e.g. thyratrons are used, will be explained. In FIG. 2, arrows indicate 90 in the switches 6a and 6b mean that switching currents flow in the directions thereof. The switches 6a and 6b are connected in parallel with polarities inverted to each other. When the high voltage switch 27 is connected with the positive DC high voltage power supply 6a, only the switch 7a is triggered and on the contrary when the high voltage switch 27 is connected with the negative DC high voltage power supply 7b, only the switch 6b is triggered.

Figure 3:
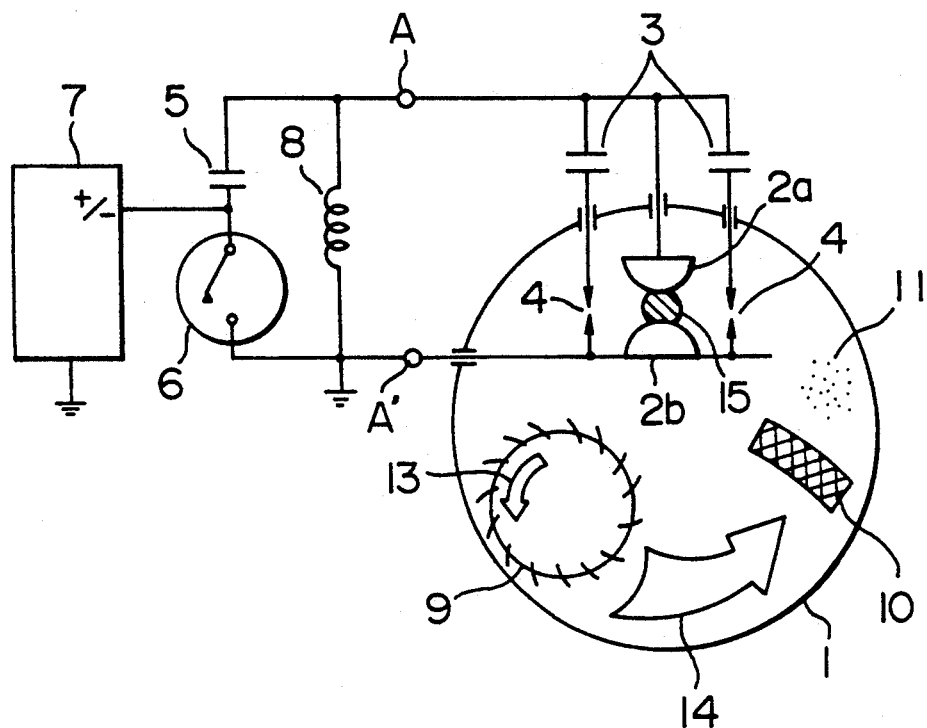
FIG. 3 is a diagram indicating schematically the construction of a discharge excitation high repetition rate excimer laser device used in a second embodiment of the present invention.

FIG. 3 is a diagram indicating schematically the construction of a discharge excitation high repetition rate excimer laser device used in the second embodiment of the present invention. In the present embodiment the positive and negative DC high voltage power supplies 7a and 7b are not switched-over alternately for every cycle by means of the high voltage switch 27 as in the first embodiment indicated in FIG. 1, but one DC high voltage power supply 7 outputs a positive and a negative DC high voltage alternately for every cycle. Otherwise the operation and the effect thereof are identical to those described for the first embodiment indicated in FIG. 1.

Figure 4:
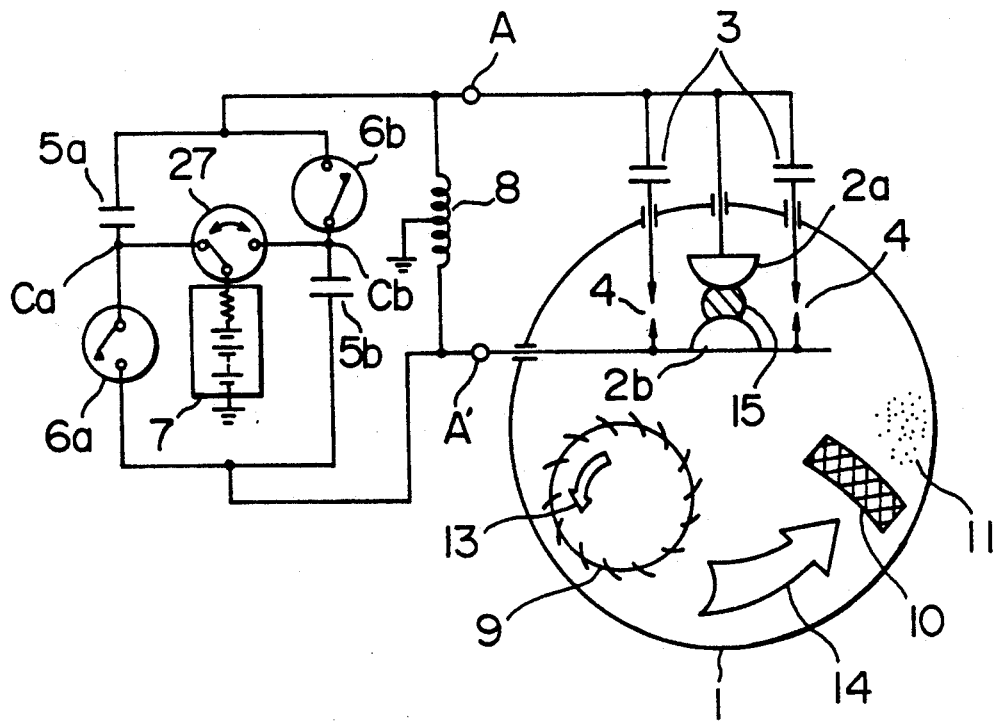
FIG. 4 is a diagram indicating schematically the construction of a discharge excitation high repetition rate excimer laser device used in a third embodiment of the present invention.

FIG. 4 is a diagram indicating schematically the construction of a discharge excitation high repetition rate excimer laser device used in the third embodiment of the present invention. In the present embodiment, the laser device is provided with 2 routes composed of a charging condenser 5a and a switch 6a, and a charging condenser 5b and a switch 6b, respectively. These two series connections are connected in parallel so as to be in directions opposite to each other. The DC high voltage power supply 7 is connected with points Ca and Cb indicated in FIG. 4, switched-over for every cycle by means of the high voltage switch 27. Further the center point of the charging inductor 8 is grounded. Otherwise the present embodiment is identical in the construction to the first embodiment indicated in FIG. 1 or the second embodiment indicated in FIG. 2.

Now the operation of the discharge excitation high repetition rate excimer laser device i he third embodiment indicated in FIG. 4 will be described. At first, it is supposed that in a certain cycle K the high voltage switch 27 is connected with the point Ca, i.e. the side of the charging condenser 5a. At this time, the electrical operation of the discharge excitation high repetition rate excimer laser device in the present embodiment is identical to the operation of the conventional example indicated in FIG. 15. That is, when the switch 6a is closed at the point of time where the charging of the charging condenser 5a has been terminated, electric charge is transferred from the charging condenser 5a to the peaking condenser 3. Together therewith, the potential at the point A increases in the negative direction with respect to the potential at the point A'. Finally a DC pulse discharge is produced, for which the one main electrode 2a serves as the cathode, while the other main electrode 2b serves as the anode. The laser medium gas 11 in the discharge region 15 is discharge-excited, which gives rise to the laser oscillation.

In the succeeding cycle (K+1) the high voltage switch 27 is switched-over to the point Cb, i.e. the side of the charging condenser 5b. When the switch 6b is closed at the point of time where the charging of the charging condenser 5b has been terminated, electric charge is transferred from the charging condenser 5b to the peaking condenser 3. Together therewith, inversely to the direction in the cycle K, the potential at the point A increases in the positive direction with respect to the potential at the point A'. At last a DC pulse discharge is produced, for which the one main electrode 2a serves as the anode, while the other main electrode 2b serves as the cathode. The laser medium gas 11 in the discharge region 15 is discharge-excited, which gives rise to the laser oscillation.

As described above, in the third embodiment, although the DC high voltage power supply 7 is unipolar, the oscillation is repeated by inverting the polarity of the one main electrode 2a and the other main electrode 2b alternately for every cycle in the same way and the effect thus obtained is identical to that obtained in the first and the second embodiment.

Figure 5:
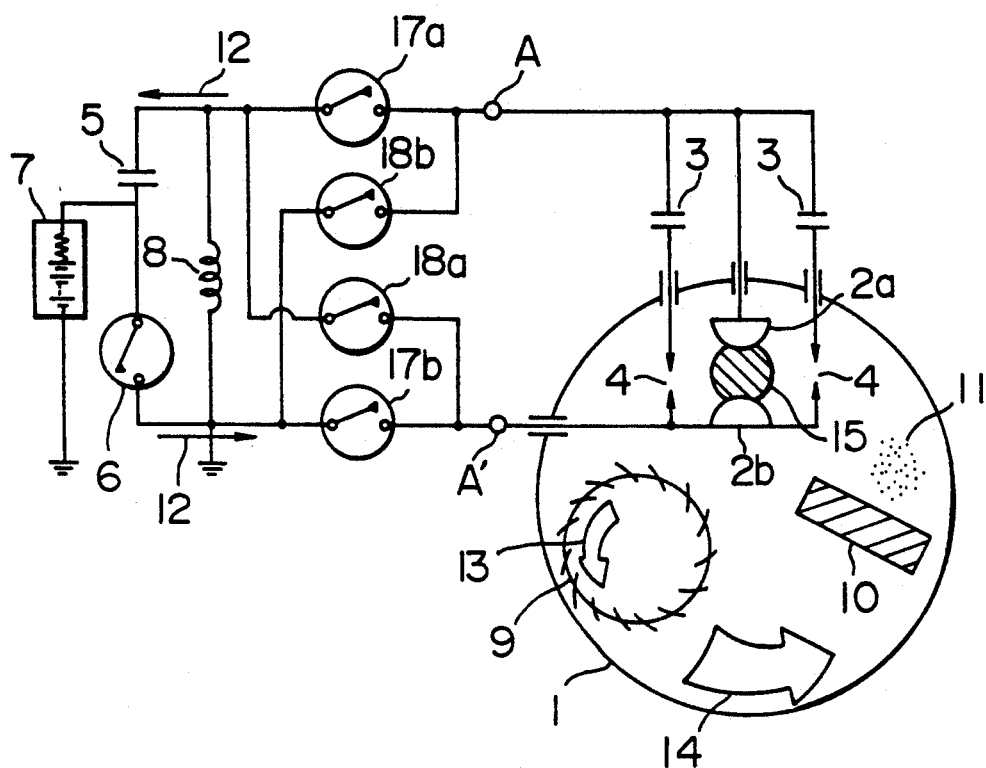
FIG. 5 is a diagram indicating schematically the construction of a discharge excitation high repetition rate excimer laser device used in a fourth embodiment of the present invention.
Figure 6:
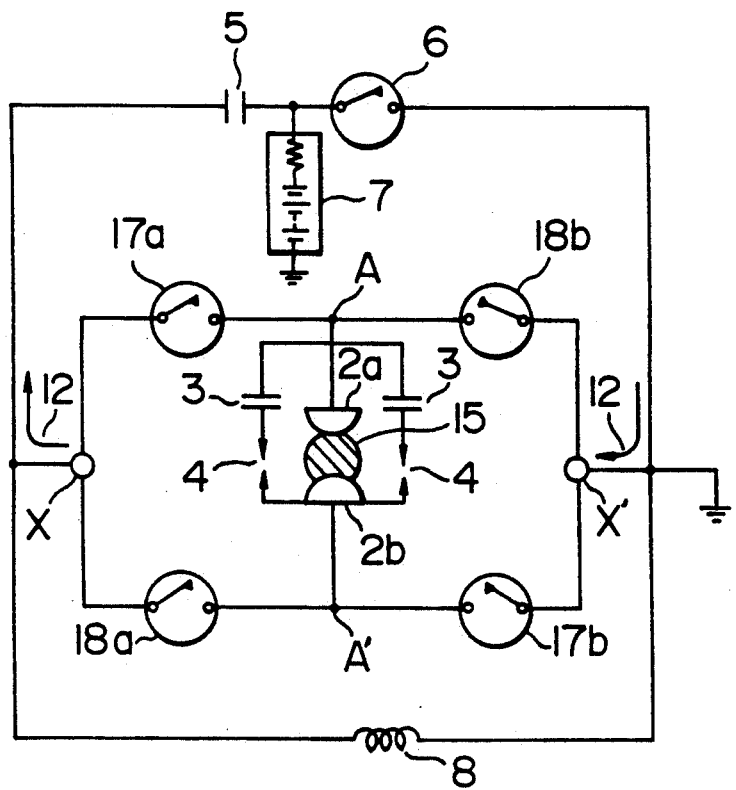
FIG. 6 is a circuit diagram of the principal part of the same excimer laser device.

FIG. 5 is a diagram indicating schematically the construction of a discharge excitation high repetition rate used in the fourth embodiment of the present invention. In FIG. 5, 17a, 17b, 18a and 18b are switches constituting a switching circuit. FIG. 6 is a circuit diagram of the principal part for explaining the operation of the discharge excitation high repetition rate excimer laser device indicated in FIG. 5. In FIG. 6, points X and X' are confluence or ramification points of the transfer current 12 flowing in directions indicated by different arrows.

Figure 7:
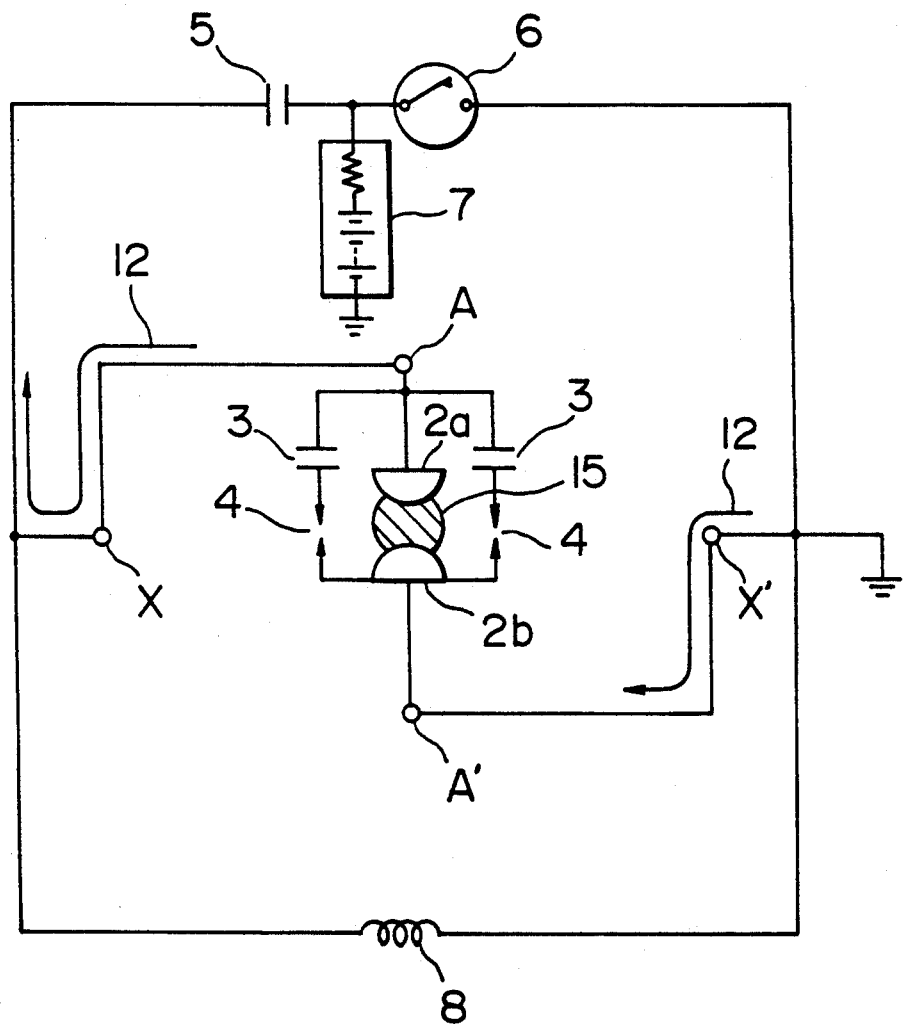
FIG. 7 is an equivalent circuit diagram in a cycle L of the same excimer laser device.

Now the operation of the discharge excitation high repetition rate excimer laser device in the fourth embodiment indicated in FIG. 6 will be explained. It is supposed that the switches are so set that the switches 17a and 17b are turned-on, while the switches 18a and 18b are turned-off in a certain cycle L. At first, electric charge is stored in the charging condenser 5 by the DC high voltage power supply 7. During this charging period of the charging condenser 5, on and off setting of the switches 17a, 17b, 18a and 18b is effected. Up to the point of time where the switch 6 is closed, since the potential difference between the two terminals of the charging inductor 8 is almost zero, it is not necessary for the switches 17a, 17b, 18a and 18b to switch the high voltage. At this time, the circuit of the discharge excitation high repetition rate excimer laser device in the fourth embodiment is equivalent to the circuit indicated in FIG. 7. Consequently the electrical operation in this cycle L is identical to the operation of the prior art discharge excitation high repetition rate excimer laser device indicated in FIG. 15. When the switch 6 is closed at the point of time where the charging of the charging condenser 5 has been terminated, the transfer current 12 flows from the charging condenser 5 to the peaking condenser 3. The transfer current 12 flows out from the point A and pours in the point A' as indicated by the arrows. Electric charge is transferred to the peaking condenser 3 by this transfer current 12. Together therewith, the potential at the point A increases in the negative direction with respect to the potential at the point A'. At last a DC pulse discharge is produced, for which the one main electrode 2a serves as the anode, while the other main electrode 2b serves as the cathode. The laser medium gas 11 in the discharge region 15 is discharge-excited, which gives rise to the laser oscillation.

Figure 8:
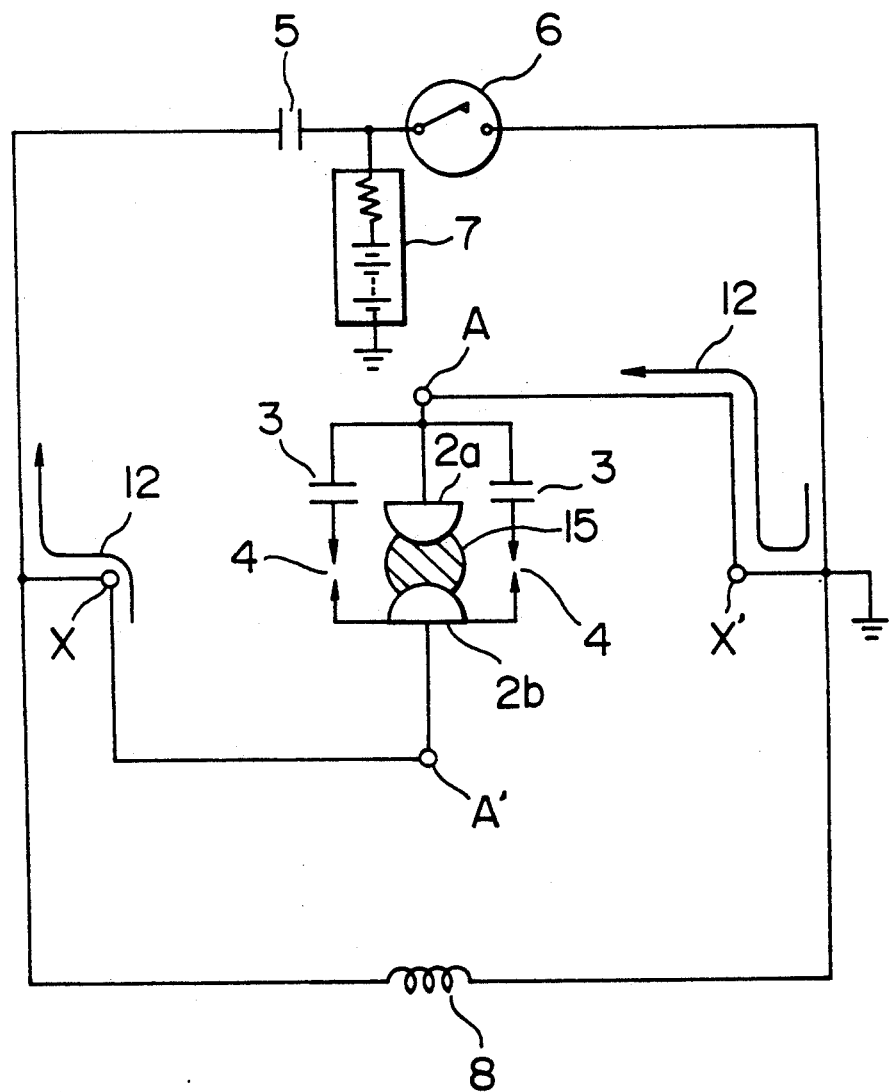
FIG. 8 is an equivalent circuit diagram in a cycle (L+1) of the same excimer laser device.

In the succeeding cycle (L+1) the switches indicated in FIG. 6 are so set that the switches 18a and 18b are turned-on, while the switches 17a and 17b are turned-off. Also in this cycle (L+1), similarly to the cycle L, since the on and off setting of the switches 17a, 17b, 18a and 18b is effected during the charging period of the charging condenser 5, it is not necessary for the switches 17a, 17b, 18a and 18b to switch-over the high voltage. At this time, the circuit of the present embodiment is equivalent to the circuit diagram indicated in FIG. 8. When the switch 6 is closed at the point of time where the charging of the charging condenser 5 has been terminated, the charge-transfer current 12 flows from the charging condenser 5 to the peaking condenser 3, the direction of the current being from the point A' to the point A, as indicated by the arrows. Consequently, in this cycle (L+1), electric charge is transferred to the peaking condenser 3 by the transfer current 12. Together therewith, contrarily to the cycle L, the potential at the point A' increases in the negative direction with respect to the potential at the point A. At last a DC pulse discharge is produced, for which the one main electrode 2a serves as the anode, while the other main electrode 2b serves as the cathode. The laser medium gas 11 in the discharge region 15 is discharge-excited, which gives rise to the laser oscillation.

As described above, in the fourth embodiment, the oscillation is repeated by inverting the polarity of the one main electrode 2a and the other main electrode 2b alternately for every cycle by means of the switching circuit composed of a plurality of switches 17a, 17b, 18a and 18b and it is equal in the effect to the first and the third embodiment. Further, since the switches 17a, 17b, 18a and 18b are switched-over in a state where no high voltage is applied thereto and they don't switch any high voltage as the switch 6, almost no switching loss in the switches 17a, 17b, 18a and 18b is produced. Consequently, increase in the loss due to the fact that the switching circuit is newly mounted on the prior art discharge excitation high repetition rate excimer laser device can be practically neglected. For the switches 17a, 17b, 18a and 18b constituting the switching circuit, e.g. high voltage relays, semiconductors, etc. can be used.

Figure 9:
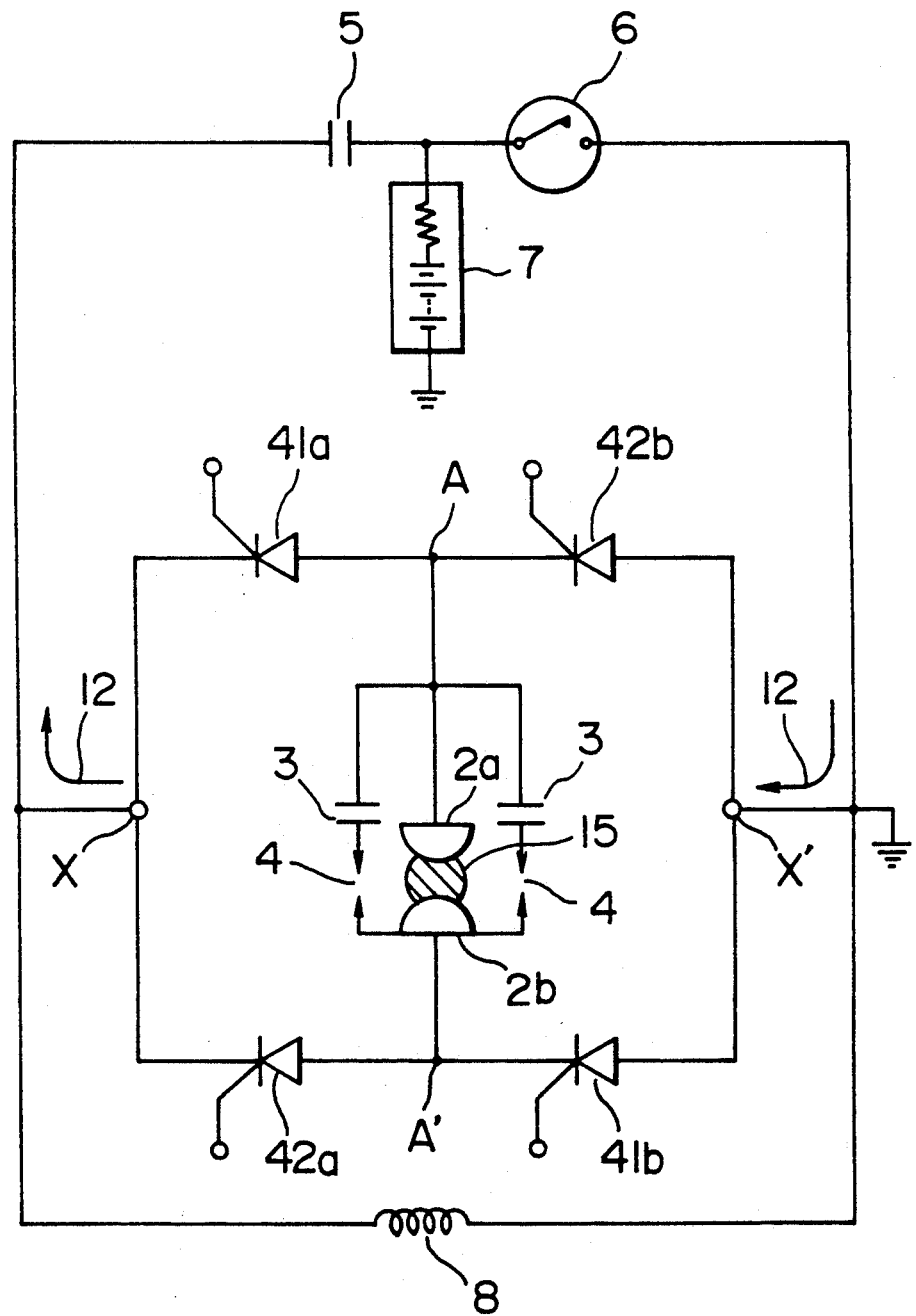
FIG. 9 is a circuit diagram of a discharge excitation high repetition rate excimer laser device used in a fifth embodiment of the present invention.

FIG. 9 is a circuit diagram of a discharge excitation high repetition rate excimer laser device used in the fifth embodiment of the present invention. In the present embodiment, the switches 17a, 17b, 18a and 18b of the fourth embodiment constituting the switching circuit are constructed by using thyristors 41a, 41b, 42a and 42b, which are semiconductor switches. Otherwise it is identical in the operation and the effect to the fourth embodiment indicated in FIG. 6. Triggering circuits for the thyristors 41a, 41b, 42a and 42b are omitted, because they have no direct relation with the present invention. In the present embodiment, it corresponds to turning-on the switches to input trigger signals to the gates of the thyristors 41a, 41b, 42a and 42b, while it corresponds to turning them off to input no trigger signals thereto. Since the setting of these thyristors 41a, 41b, 42a and 42b is effected during the charging period (usually several ms) of the charging condenser 5, the switching speed thereof may be not very high and therefore it is not necessary to use any high speed thyristors, which are expensive. In the present embodiment only the withstand voltage and the current capacity of the thyristors 41a, 41b, 42a and 4 be taken into account. If one element cannot fulfill these requirements, a plurality of elements connected suitably in series and/or in parallel can be used therefor. Further, although the present embodiment has been explained, supposing that the thyristors are used for example for semiconductor switches, the same operation and effect can be expected also for other semiconductor elements such as transistors, FETS, etc., if the withstand voltage and the current capacity thereof fulfil the requirement.

Figure 10:
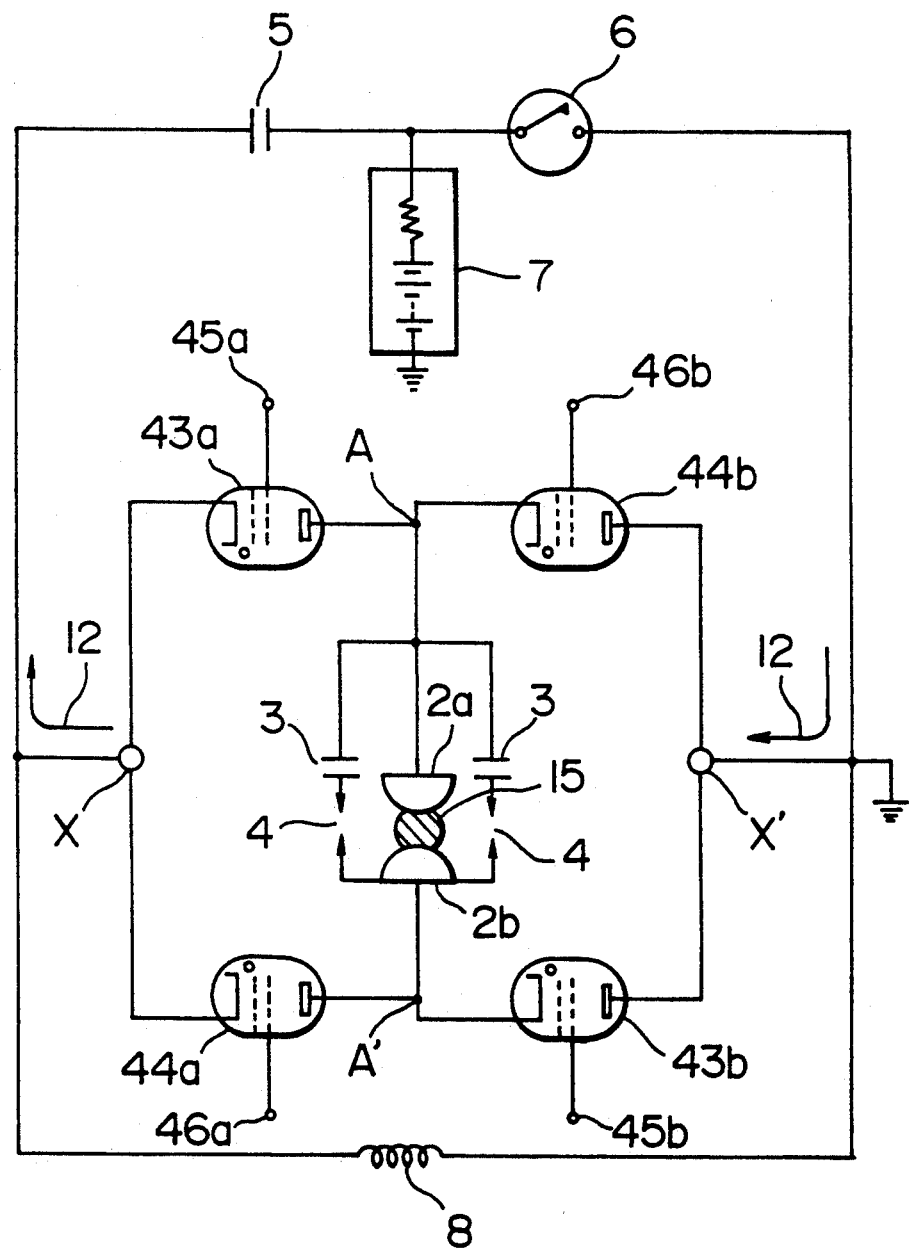
FIG. 10 is a circuit diagram of a discharge excitation high repetition rate excimer laser device used in a sixth embodiment of the present invention.

FIG. 10 is a circuit diagram of a discharge excitation high repetition rate excimer laser device used in the sixth embodiment of the present invention. In the present embodiment, the switches 17a, 17b, 18a and 18b for constituting the switching circuit indicated in FIG. 6 are replaced by tetrode thyratrons 43a, 43b, 44a and 44b, which are discharge switches, and otherwise it is identical in the operation and the effect to the fourth embodiment indicated in FIG. 6. 45a, 45b, 46a and 46b are control grids of the tetrode thyratrons 43a, 43b, 44a and 44b, respectively. Since heating circuits and trigger circuits for the tetrode thyratrons 43a, 43b, 44a and 44b have no direct relation with the present invention, they are omitted. For the tetrode thyratrons, it corresponds to switching-off to bias the control grids 45a, 45b, 46a and 46b negatively with respect to the respective cathodes, while it corresponds to switching-on to remove the negative biases. The peak value of the laser excitation discharge voltage in the discharge excitation high repetition rate excimer laser is usually over 20 kV, although it is transient. Therefore it is required that the withstand voltage of the switches 17a, 17b, 18a and 18b indicated in FIGS. 5 and 6 is over 20 kV. That is, if semiconductor switches are used therefor, it is necessary to use a plurality of semiconductor switches having a withstand voltage of several kV per one switch connected in series in multistage. However, if discharge switches such as thyratrons are used, since it is possible to easily realize a withstand voltage higher than 40 kV by one stage, the construction of the whole device is simplified and reliability is improved. Although explanation of the present invention has been made, taking tetrode thyratrons as an example, it is a matter of course that the same operation and effect can be expected also for discharge switches such as spark gaps, if the withstand voltage and the current capacity thereof fulfil the requirement.

Figure 11:
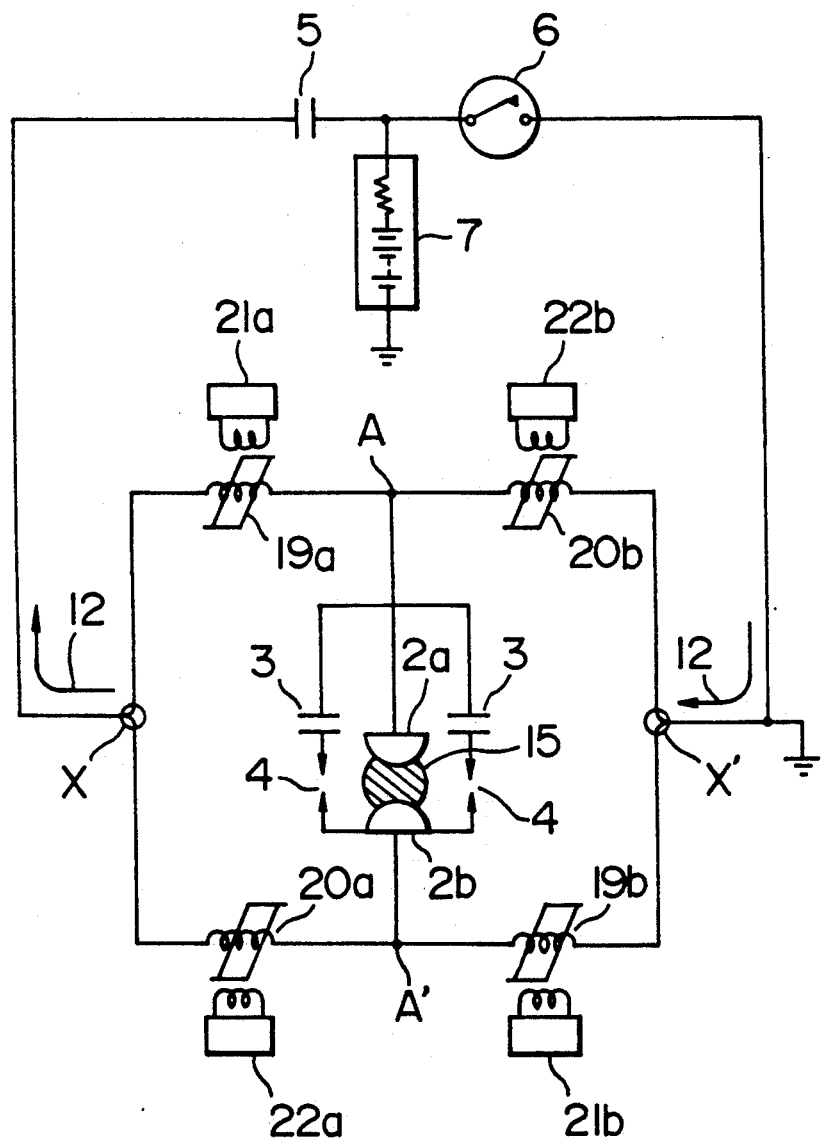
FIG. 11 is a circuit diagram of a discharge excitation high repetition rate excimer laser device used in a seventh embodiment of the present invention.

FIG. 11 is a circuit diagram of a discharge excitation high repetition rate excimer laser device in the seventh embodiment of the present invention. In the present embodiment, saturable reactors are used in place of the switches 17a, 17b, 18a and 18b for constructing the switching circuit indicated in FIG. 6. The elements corresponding to the constituent elements in the fourth embodiment indicated in FIG. 5 or 6 are indicated by same reference numerals. In FIG. 11, 19a, 19b, 20a and 20b represent saturable reactors corresponding to the switches 17a, 17b, 18a and 18b, respectively, in the fourth embodiment indicated in FIG. 6. Further 21a, 21b, 22a and 22b are bias circuits, which make excitation current flow through the saturable reactors 19a, 19b, 20a and 20b, respectively. In the seventh embodiment, since the saturable reactors 19a, 19b, 20a and 20b play also the role of the charging inductor in common, the charging inductor 8, which was necessary for the first to sixth embodiments of the present invention, can be omitted. The forward direction is taken as the direction in which the charge-transfer current 12 indicated by the arrows flows through the respective surable reactors 19a, 19b, 20a and 20b. In the case of not such a charge-transfer current 12 but of the excitation current, it is also taken as a forward current when the direction of the magnetic field induced by the excitation current in the related saturable magnetic core is in accordance with the direction of the magnetic field induced by the charge-transfer current 12 in the same saturable magnetic core.

The direction opposite to the forward direction is called "reverse direction". In the case of not such a transfer current 12, but of the excitation current, it is also taken as a reverse current, when the direction of the magnetic field induced by the excitation current in the related saturable magnetic core is opposite to the direction of the magnetic field induced by the transfer current 12 in the same saturable magnetic core.

Figure 12:
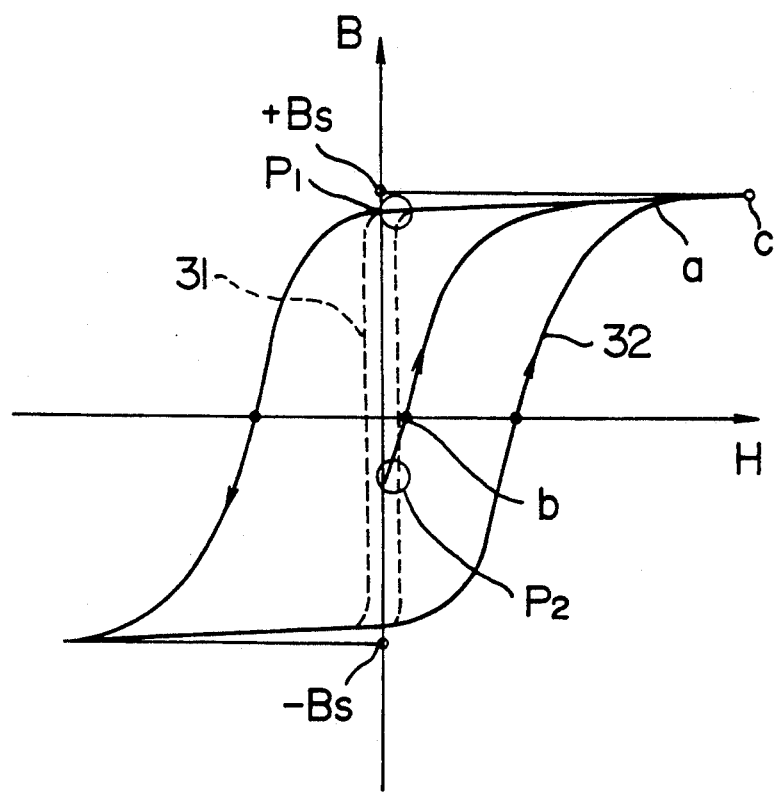
FIG. 12 shows a B-H curve for a saturable magnetic core.

FIG. 12 is a conceptual diagram of a B-H curve for a saturable magnetic core material used for the saturable reactors, e.g. a soft magnetic material such as amorphous magnetic material, etc. for explaining the state described above. In FIG. 12, a curve 31 indicated by a broken line is a DC magnetization curve for the saturable magnetic core material, while a curve 32 indicated by a full line represents a magnetization curve in a real working frequency band of the transfer current 12. Further the forward saturation magnetic flux density is denoted by $+B_s$, while the reverse saturation magnetic flux density is denoted by −Bs, which are indicated in FIG. 12.

Now the operation of the seventh embodiment will be explained, referring to FIGS. 11 and 12. At first, in a certain cycle M, the saturable reactors 19a and 19b are excited in the forward saturated state or a state close thereto by the bias circuits 21a and 21b, respectively. That is, they are set in a state indicated by P1 in FIG. 12. On the other hand, the saturable reactors 20a and 20b are weakly excited in the reverse direction by the bias circuits 22a and 22b. That is, they are set in a state indicated by P2 in FIG. 12. Electric charge is stored in the charging condenser 5 by the DC high voltage power supply 7. The excitation stated above of the saturable reactors 19a, 19b, 20a and 20b is effected in the DC-like manner during this charging period of the charging condenser 5. Current for exciting these saturable reactors 19a, 19b, 20a and 20b may be made to flow either (i) only during the charging period of the charging condenser 5 or (ii) continuously over 1 cycle. When the switch 6 is closed, at the point of time where the charging of the charging condenser 5 is terminated, the charge-transfer current 12 flows out from the charging condenser 5.

In the cycle M, the initial states of the saturable magnetic cores of both the saturable reactors 19a and 19b are at P1 in FIG. 12. Due to the transfer current 12 the states of the saturable magnetic cores of the saturable reactors 19a and 19b move from P1 to a point (c) through a point (a) along the magnetization curve 32 in the real working frequency band indicated in FIG. 12 to achieve the forward saturation. In general, inductance of a saturable reactor is proportional to relative magnetic permeability of a used saturable magnetic core, i.e. to a value dB/dH obtained by differentiating magnetic flux by magnetic field. In the working curve stated above of the saturable genetic core of the saturable reactor 19a and 19b, i.e, the curve indicated in FIG. 12, along which the state moves from P1 to the point (e) through the point (a) to achieve the forward saturation, this dB/dH is almost equal to the relative magnetic permeability of the saturable magnetic cores after the forward saturation. This value is almost equal to 1 for a saturable magnetic core used usually used for a saturable reactor.

On the other hand, the initial states of the saturable magnetic cores of the saturable reactors 20a and 20b in the cycle M are at P2 in FIG. 12 and moves in the direction along the magnetization curve 32 in the real working frequency band from P2 to the point (a) through a point (b) due to the transfer current 12. This working curve is within the non-saturation region of the saturable magnetic cores. Since the relative magnetic permeability in the non-saturation region of the saturable magnetic cores used for the saturable reactors is usually greater than the value in the saturation region by more than 2 orders, the inductance of the saturable reactors 20a and 20b is greater than the inductance of the saturable reactors 19a and 19b by more than 2 orders in the cycle M. Therefore the major part of the transfer current 12 flows through the saturable reactors 19a and 19b and almost no current flows through the saturable reactors 20a and 20b. Consequently, in this cycle M, the saturable reactors 20a and 20b are never magnetically saturated and the transfer current 12 flows in the direction in which it flows out from the point A and pours into the point A', in FIG. 11. Therefore the operation of the seventh embodiment in the cycle M is identical to the operation of the fourth embodiment indicated in FIG. 6, where the switches 17a and 17b are closed and the switches 18a and 18b are opened in the cycle L. That is, a DC pulse discharge is produced, for which the one main electrode 2a serves as the cathode, while the other main electrode 2b serves as the anode. The laser medium gas 11 in the discharge region 15 is discharge-excited, which gives rise to the laser oscillation.

In the succeeding cycle (M+1), the saturable reactors are excited contrarily to the cycle M described above. That is, the saturable reactors 19a and 19b are weakly excited in the reverse direction by the bias circuits 21a and 21b, respectively, and the saturable reactors 20a and 20b are excited in the forward saturated state or in a state close thereto by the bias circuits 22a and 22b, respectively. Also in this cycle (M+1), similarly to the cycle M, the excitation described above of the saturable reactors 19a, 19b, 20a and 20b is effected in the DC-like manner during the charging of the charging condenser 5. The current for this excitation may be made flow either only during the charging of the charging condenser 5 or continuously over 1 cycle.

When the switch 6 is closed at the point of time where the charging of the charging condenser 5 has been terminated, the transfer current 12 flows out from the charging condenser 5. In this cycle (M+1), contrary to the cycle M described above, the saturable magnetic cores of the saturable reactors 20a and 20b work in the saturation region. On the other hand, the saturable magnetic cores of the saturable reactors 19a and 19b work in the non-saturation region and thus no magnetic saturation takes place. Consequently, in the cycle (M+1) of the seventh embodiment, the inductance of the saturable reactors 19a and 19b is greater than the inductance of the saturable reactors 20a and 20b by more than 2 orders and the operation thereof is identical to the operation of the fourth embodiment indicated in FIG. 6, where the switches 17a and 17b are opened and the switches 18a and 18b are closed. That is, a DC pulse discharge is produced, for which the one main electrode 2a serves as the anode, while the other main electrode 2b serves as the cathode. The laser medium gas 11 in the discharge region 15 is discharge-excited, which gives rise to the laser oscillation.

As described above, in the seventh embodiment, the difference between the inductance of the saturable reactors in the saturation region and the inductance thereof in the non-saturation region is used as a switch constituting the switching circuit. Therefore, as the initial state of the saturable reactors driven in the non-saturation region, i.e. the saturable reactors 20a and 20b in the cycle M as well as the saturable reactors 19a and 19b in the cycle (M+1), it is sufficient that the relative magnetic permeability of the saturable magnetic core used in each of the saturable reactors is satisfactorily greater than the relative magnetic permeability (almost 1) thereof in the saturation region and that there is a suitable margin up to the forward saturation. Since it is not necessary that they are in a state close to the reverse saturation, excitation current may be smaller than that required in the case where they are driven in the saturation region.

Further, in the seventh embodiment, the saturable reactors 19a and 19b are driven only in the saturation region in the cycle M and only in the non-saturation region in the succeeding cycle (M+1). On the other hand, the saturable reactor 20a and 20b are driven only in the non-saturation region in the cycle M and only in the saturation region in the succeeding cycle (M+1), contrary thereto. Further the setting of the initial state of the saturable reactors is effected in the DC-like manner by the bias circuits during the charging period of the charging condenser 5 and they don't act as a so-called magnetic switch, by which the state thereof changes from a state close to the reverse saturation to the forward saturation in the real working frequency band.

Further almost all the loss produced from driving the saturable reactors as a switch is due to magnetic core loss and the value thereof is represented by the area of a hysteresis loop for the saturable reactor used in each of the saturable reactors. As indicated in FIG. 12, the area of the hysteresis loop of a DC magnetization curve 31 for the saturable magnetic core used in the saturable reactor is much smaller than the area of a hysteresis loop of the magnetization curve 32 in the real working frequency band. Therefore, in the seventh embodiment, it is possible to neglect increase in the loss due to the fact that the switching circuit is disposed, because loss in the saturable reactors is very small, contrarily to the usual magnetic assist method, by which the saturable reactors are driven in the real working frequency band as a switch. Furthermore, since the DC magnetic permeability of the saturable magnetic core material is greater than the magnetic permeability in the real working frequency band by more than 2 orders, excitation current for exciting the saturable reactor in the forward saturated state or a state close thereto or exciting it weakly in the reverse direction may be much smaller than the transfer current 12 and thus a small size bias circuit may be sufficient.

As described above, in the seventh embodiment, oscillation is produced repeatedly while inverting alternately the polarity of the one main electrode 2a and the other main electrode 2b producing the DC pulse discharge for every cycle by constituting the switching circuit using saturable reactors as a switch and the operation and the effect thereof are identical to those obtained in the fourth embodiment.

Figure 13:
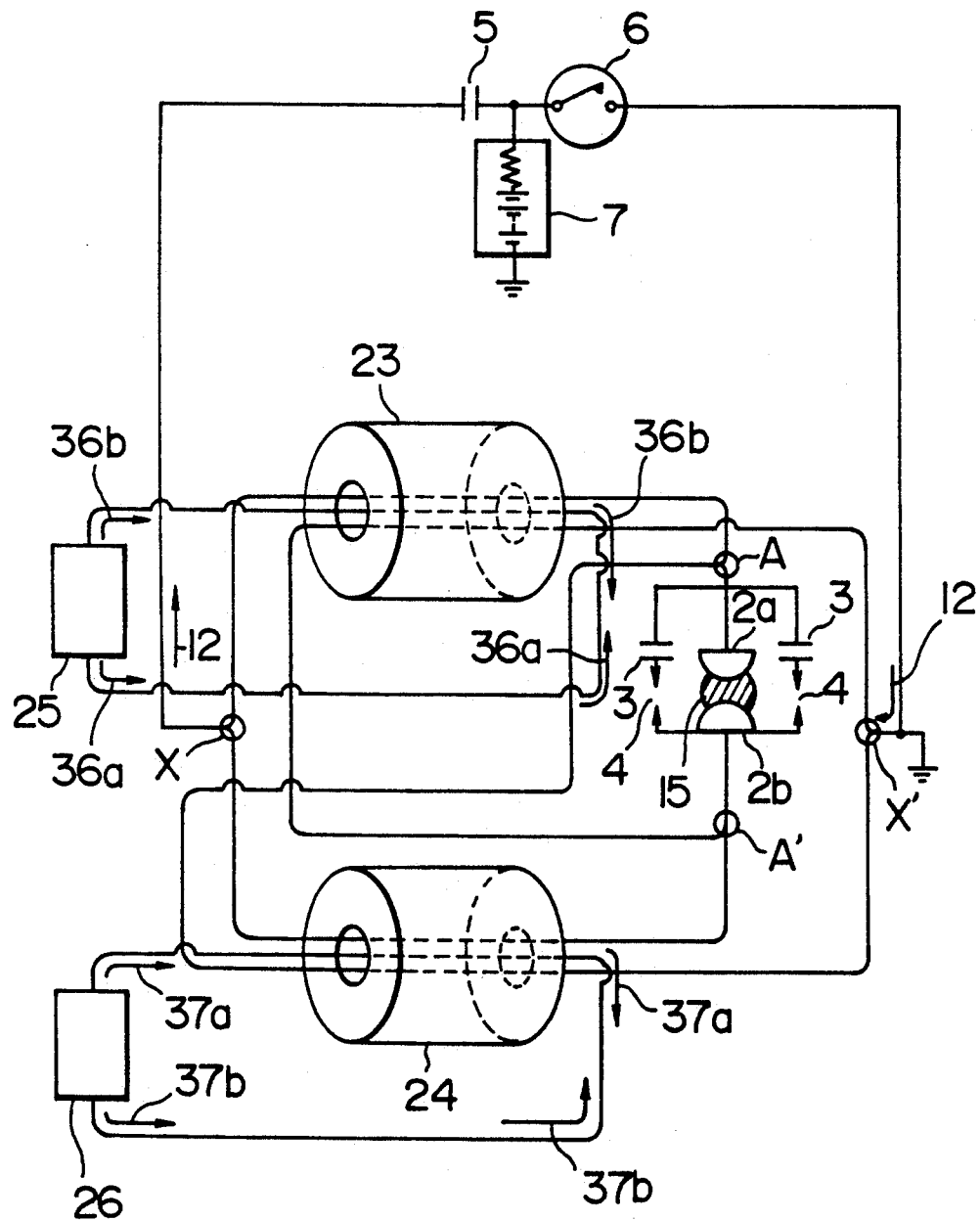
FIG. 13 is a diagram indicating schematically the construction of a discharge excitation high repetition rate excimer laser device used in a eighth embodiment of the present invention.

FIG. 13 is a diagram indicating schematically the construction of a discharge excitation high repetition rate excimer laser device in the eighth embodiment of the present invention. In FIG. 13, 23 and 24 are toroidal saturable magnetic cores. A saturable reactor is constituted by making wires pass through the central hole in each of these toroidal saturable magnetic cores 23 and 24. The number of each of the wires passing therethrough in the number of turns of the saturable reactor. Although, in FIG. 13, each of these wires is wound only by one turn, it is possible to construct a saturable reactor having a greater number of turns by winding each of the wires a plurality of times. 25 is a bias circuit making excitation currents 36a and 36b flow through the saturable magnetic core 23, while 26 is a bias circuit making excitation current 37a and 37b flow through the saturable magnetic core 24. Also in this eighth embodiment, since the saturable reactor plays the role of the charging inductor in common, the charging inductor 8 in the first embodiment of the present invention can be omitted.

Now the operation of the eighth embodiment will be explained, referring to FIG. 13. When the switch 6 is closed at the point of time where the charging of the charging condenser 5 has been terminated, the transfer current 12 flows in the direction indicated by arrows from the charging condenser 5. This transfer current 12 flows, in the saturable magnetic core 23, in the direction from the ramification point X' to the point A', traversing the saturable magnetic core 23 from the right to the left as one faces FIG. 13 (i.e., as shown in FIG. 13), as well as in the direction from the point A to the confluence point X, traversing the saturable magnetic core 23 from the right to the left as one faces FIG. 13. On the other hand, this transfer current 12 flows, in the saturable magnetic core 24, in the direction from the ramification point X' to the point A, traversing the saturable magnetic core 24 from the right to the left as one faces FIG. 13, as well as in the direction from the point A' to the confluence point X, traversing the saturable magnetic core 24 from the right to the left as one faces FIG. 13. Consequently the forward direction defined in the seventh embodiment of the present invention is the direction, in which current flows through the saturable magnetic cores 23 and 24 from the right to the left as one faces FIG. 13 and the reverse direction is the direction, in which current flows through the saturable magnetic cores 23 and 24 from the left to the right as one faces FIG. 13.

In a certain cycle N, during the charging period of the charging condenser 5, the bias circuit 25 outputs a DC-like excitation current 36a, while the bias circuit 26 outputs a DC-like excitation current 37a. These excitation currents 36a and 37a may be made flow either only during the charging period of the charging condenser 5 or continuously over 1 cycle. Since the excitation current 36a flows in the direction traversing the saturable magnetic core 23 from the right to the left as one faces FIG. 13, it is a forward current. The saturable magnetic core 23 is excited in the forward saturated state or in a state close thereto by this excitation current 36a. On the contrary, since the excitation current 37a flows in the direction traversing the saturable magnetic core 24 from the left to the right as one faces FIG. 13, it is a reverse current. The saturable magnetic core 24 is excited weakly in the reverse direction by this excitation current 37a. Consequently, in the cycle N in the eighth embodiment, similarly to the seventh embodiment, the relative magnetic permeability for the forward current flowing through the saturable magnetic core 23 is smaller than the relative magnetic permeability for the forward current flowing through the saturable magnetic core 24 by more than 2 orders. That is, the inductance of the saturable reactor consisting of the saturable magnetic core 23 and the wires traversing it for the forward current is smaller than the inductance of the saturable reactor consisting of the saturable magnetic cord 24 and the wires traversing it for the forward current by more than 2 orders. Consequently, in the cycle N in the eighth embodiment, the major part of the transfer current 12 flows through the wires traversing the saturable magnetic core 23 and almost no current flows through the wires traversing the saturable magnetic core 24. As the result, in this cycle N, the saturable magnetic core 24 is never magnetically saturated and the transfer current 12 flows out from the point A and pours in the point A'. Therefore the operation of the eighth embodiment in the cycle N is identical to the operation of the fourth embodiment indicated in FIG. 6, when the switches 17a and 17b are closed and the switches 18a and 18b are opened, which switches constitute the switching circuit. In this way, a DC pulse discharge is produced, for which the one main electrode 2a serves as the cathode, while the other main electrode 2b serves as the anode. The laser medium gas 11 in the discharge region 15 is discharge-excited, which gives rise to the laser oscillation. In the succeeding (N+1) cycle, during the charging period of the charging condenser 5, the bias circuit 25 outputs the DC-like excitation current 36b, while the bias circuit 26 outputs the DC-like excitation current 37b. These excitation currents 36b and 37b may be made to flow either (i) only during the charging period of the charging condenser 5 or (ii) continuously over 1 cycle. Since the directions in which the excitation currents 36b and 37b flow are opposite to the directions the excitation currents 36a and 37a flow in the cycle N, respectively, the directions of the excitations of the saturable magnetic cores 23 and 24 are also opposite to those in the cycle N. That is, the saturable magnetic core 24 is excited in the forward saturated state or in a state close thereto and the saturable magnetic core 23 is excited weakly in the reverse direction. Consequently, in the cycle (N+1) in the eighth embodiment contrary to the cycle N, the relative magnetic permeability of the saturable magnetic core 24 for the forward current is smaller than the relative permeability of the saturable magnetic core 23 for the forward current by more than 2 orders. Consequently the inductance of the saturable reactor consisting of the saturable magnetic core 24 and the wires traversing it for the forward current is smaller than the inductance of the saturable reactor consisting of the saturable magnetic core 23 and the wires traversing it for the forward current by more than 2 orders. The major part of the transfer current 12 flows through the wires traversing the saturable magnetic core 24, while almost no current flows through the wires traversing the saturable magnetic core 23. As the result, in cycle (N+1), the saturable magnetic core 23 is never magnetically saturated and the transfer current 12 flows out from the point A, and pours into the point A. Therefore the operation of the eighth embodiment in the cycle (N+1) is contrary to the cycle N, identical to the operation of the fourth embodiment indicated in FIG. 6, when the switches 18a and 18b are closed and the switches 17a and 17b are opened, which switches constitute the switching circuit. In this way, a DC pulse discharge is produced, for which the one main electrode 2a serves as the anode, while the other main electrode 2b serves as the cathode. The laser medium gas 11 in the discharge region 15 is discharge-excited, which gives rise to the laser oscillation.

As described above, also in the eighth embodiment, similarly to the seventh embodiment, the difference between the inductance of the saturable reactors in the saturation region and the inductance thereof in the non-saturation region is used as a switch constituting the switching circuit. Therefore, as the initial state of the saturable reactors driven in the non-saturation region, i.e. the saturable reactor 23 in the cycle N and the saturable reactor 24 in the cycle (N+1), it is sufficient that the relative magnetic permeability of the saturable magnetic core used in each of the saturable reactors is greater satisfactorily than the relative magnetic permeability (almost 1) thereof in the saturation region and that there is a suitable margin up to the forward saturation. Since it is not necessary that they are in a state close to the reverse saturation, excitation current may be smaller than that required in the case where they are driven in the saturation region.

Further, in the eighth embodiment, similarly to the seventh embodiment, since the saturable reactors effect no switching operation in the real working frequency band, loss in the saturable reactors is small and it is possible to neglect increase in the loss due to the fact that the switching circuit is disposed.

Furthermore, the saturable reactor comprising the wire from the ramification point XI to the point A, traversing the saturable magnetic core 23 from the right to the left as one faces FIG. 13, and the saturable magnetic core 23 indicated in FIG. 13 corresponds to the saturable reactor 19b indicated in FIG. 11, while the saturable reactor comprising of the wire from the point A to the confluence point X, traversing the saturable magnetic core 23 from the right to the left as one faces FIG. 13, and the saturable magnetic core 23, indicated in FIG. 13 corresponds to the saturable reactor 19a indicated in FIG. 11. Similarly the saturable reactor consisting of the wire from the ramification point X to the point A, traversing the saturable magnetic core 24 from the right to the left as one faces FIG. 13, and the saturable magnetic core 24 corresponds to the saturable reactor 20b indicated in FIG. 11, while the saturable reactor consisting of the wire from the point A' to the confluence point X, traversing the saturable magnetic core 24 from the right to the left as one faces FIG. 13, and the saturable magnetic core 24 corresponds to the saturable reactor 20a indicated in FIG. 11.

Consequently, in the eighth embodiment, one saturable magnetic core 23 is used instead of the saturable magnetic cores 19a and 19b, and one saturable reactor 24 is used instead of the magnetic cores 20a and 20b. The two saturable magnetic cores 23 and 24 is used in FIG. 13, instead of the four switches 17a, 17b, 18a and 18b constituting the switching circuit in FIG. 6.

By this method, not only the number of parts is reduced and the real construction is, simplified, which improves the reliability, but also the following advantages can be obtained.

As explained in the seventh embodiment, the saturable magnetic cores in the saturable reactors 19a and 19b are driven in the saturated region in the cycle M and in the unsaturated region in the succeeding cycle (M+1) by the transfer current 12. That is, since the saturable reactors 19a and 19b are put under the same working conditions in any cycle, it is desirable that they have similar characteristics. Similarly, sin the saturable reactors 20a and 20b are put under the same working conditions in any cycle, it is desirable that they have similar characteristics. In the eighth embodiment indicated in FIG. 13, since the saturable reactors 19a and 19b are constructed so as to use one saturable magnetic core 23 in common, the characteristics of the two are similar and therefore they work ideally under a completely identical condition. On the other hand, since the saturable reactors 20a and 20b are constructed similarly so as to use one saturable magnetic core 24 in common, the characteristics of the two are similar and therefore they work ideally under a completely identical condition.

As described above, in the eighth embodiment, the oscillation is produced repeatedly while alternately inverting the polarity of the one main electrode 2a and the other main electrode 2b effecting the DC pulse discharge for every cycle by using the saturable reactors as the switch constituting the switching circuit, and both the operation and the effect don't differ from those obtained in the fourth to seventh embodiments. However, in the seventh and the eighth embodiment, the saturable reactors are used as a changing-over switch and the control thereof is effected by switching-over the excitation current. As described above, the setting of the saturable reactors is effected in the DC-like manner and the switch-over of the excitation should be effected with a same speed as the repetition of the laser oscillation.

Figure 14:
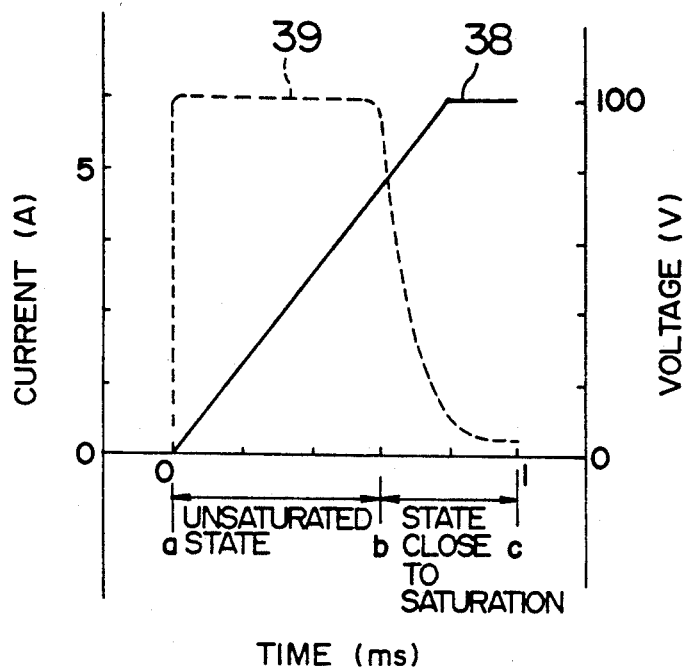
FIG. 14 shows an output waveform of a bias circuit used in the same excimer laser device.

FIG. 14 shows an example of the output waveform of the bias circuit 25 outputting the excitation currents 36a and 36b in FIG. 13. In FIG. 14, a full line 38 represents an excitation current waveform, while a broken line indicates a voltage waveform. The abscissa represents the time, indicating the cycle number N in the eighth embodiment, a-b being a period, in which the saturable magnetic core 23 is in the unsaturated state and the excitation current 36a is rising, and b-c being a period, in which the saturable magnetic core 23 is approaching the saturated state by the excitation current 36a. The ordinate represents the intensity of the current and the height of the voltage. The saturable magnetic core material used for the saturable reactors has an extremely great relative magnetic permeability in the unsaturated state in the low frequency band. Consequently, the inductance of the circuit, through which the excitation current 36a flows, is extremely high in a low frequency band as low as the repetition rate of the laser oscillation and has a value as high as several niH according to an experiment of the inventors of the present invention. In the seventh and the eighth embodiment, the magnetically saturated saturable reactors are used as a closed switch. According to an experiment of the inventors, DC excitation current of at least 6A was required for saturating magnetically the saturable magnetic cores. Here the repetition frequency of the laser oscillation is denoted by f; the inductance of the circuit, through which the excitation current 36a flows, by L; the excitation current required for saturating magnetically the saturable magnetic cores by I; and the output voltage of the bias circuit 25 by V. The excitation current 36a should reach I in the charging period of the charging condenser 5. Since the duration of the laser excitation discharge is very short and it can be neglected, the charging time of the charging condenser 5 is almost equal to the inverse of the repetition frequency of the laser oscillation (1/f). Consequently, the output voltage of the bias circuit 25 necessary for the excitation current 36a to reach I within this period of time (1/f) can be given by $V=(L\cdot I)/f$, using a relation $V=L\cdot dI/dt$. According to an experiment of the inventors, an output voltage of the bias circuit 25 over 100V was necessary fog a repetition frequency of 1 kHz of the laser oscillation. This means that the output voltage of the bias circuit 25 has a great value in this period a-b, where the excitation current 36a is rising, in FIG. 14. However, when the saturable magnetic core 23 approaches the saturated state by the excitation current 36a, i.e. when it reaches the region b-c in FIG. 14, the relative magnetic permeability decreases rapidly. For this reason, also the inductance of the circuit, through which the excitation current 36a flows, decreases rapidly. In this state, if the output voltage of the bias circuit 25 were fixed at the value obtained at the unsaturated state of the saturable magnetic core 23, i.e. at the voltage in the period a-b in FIG. 14, the excitation current 36a would rapidly increase and at last the bias circuit 25 would be destroyed. Consequently, when the saturable magnetic core approaches the saturated state and the excitation current begins to increase rapidly, it is necessary to decrease suitably the output voltage of the bias circuit 25. This means that the output voltage of the bias circuit 25 decreases in the period b-c in FIG. 14. That is, the bias circuit 25 should output a current having an intensity over 6A over a wide voltage range from almost 0V to a voltage over 100V. However, if it were tried to obtain such an output by means of a series power supplying circuit or a linear amplifying circuit, heat loss in the bias circuit would be tremendous and the size of the circuit itself would be great. A switching-mode power supplying circuit is conceivable as a circuit, from which a high intensity current can be taken out over a wide voltage range and in addition whose loss is small. According to an experiment of the inventors, in the eighth embodiment, contrary to the fact that heat loss in the bias circuit 25 and 26 at a repetition frequency of 1 kHz of the laser oscillation was about 400W, when a series power supplying circuit was used for this bias circuit, it was about 30W, when a switching-mode power supply was used therefor, i.e. it was suppressed at a value under 1/10 of the former.

Although in the embodiments described above the operation and the effect have been explained for the discharge excitation high repetition rate excimer laser device having an automatic preionization capacity transient type circuit structure, it is a matter of course that in any laser device, if it is a discharge excitation gas laser device, in which the laser medium is discharge-excited by DC pulse discharge, a similar effect can be obtained by inverting the polarity of the main electrodes effecting the DC pulse discharge for every cycle. Further, in the case where it is difficult to invert the polarity of the main electrodes effecting the DC pulse discharge for every cycle, due to a problem on the operation speed of the switches constituting the switching circuit, etc., the polarity of the main electrodes may be inverted e.g. for every two cycles, for every three cycles, etc. However it is a matter of course that the maximum effect can be obtained, when the polarity of the main electrodes is inverted for every cycle. It is obvious that repetition of the inversion of the polarity of the main electrodes effecting the DC pulse discharge gives rise no more to any advantage, if it is effected with a too long period, e.g. with a period over 100 cycles. However, it is a matter of course that a remarkable effect can be expected for elongating the life of the main electrodes even if such an operation is carried out.

As described above, the laser device according to the present invention is provided with laser medium gas and a pair of electrodes in a gas-tight vessel and has a construction, in which the laser medium gas is discharge-excited while inverting the polarity of DC pulses applied to the pair of electrodes. In this way, since distribution of atoms and ions constituting the laser medium gas in the discharge region including the neighborhood of the main electrodes is made uniform even at a high repetition rate oscillation, stability of the DC pulse discharge is improved without increasing unnecessarily the flow speed of the laser medium gas and lowering in the pulse energy takes place no more owing to a high efficiency operation. Thus it is possible to realize an excellent discharge excitation gas laser device capable of improving life characteristics of the laser medium gas.

Further, since unequal impairment of the main electrodes is removed, not only the life of the whole device is elongated, but also the size of the ventilation device for circulating the laser medium gas may be reduced. In this way it is possible to realize a discharge excitation gas laser device having a small size and weight and a small electric power consumption.

We claim:

1. A laser device excitable in accordance with a TEA (transversely excited atmospheric)-type excitation scheme, said laser comprising:
   a gas-tight vessel;
   a laser medium gas contained in said vessel;
   primary circuit means comprising main condenser means connected to a parallel circuit including voltage power supply means and main switching means;
   secondary circuit means comprising a pair of electrodes disposed within said vessel and connected in parallel with peaking condenser means;
   switching circuit means comprising at least four switches connected in series in a loop, said switching circuit means being electrically connected to said secondary circuit means;
   said switching circuit means and said main switching means cooperating to selectively invert a polarity of DC pulses applied to said secondary circuit so as to excite said laser medium gas to discharge.

2. A laser device according to claim 1, wherein semiconductor elements are used as the switches.

3. A laser device according to claim 1, wherein discharge switches are used as the switches.

4. A laser device according to claim 1, wherein saturable reactors are used as the switches.

5. A laser device according to claim 4, wherein one saturable magnetic core is used in common for a plurality of windings of saturable reactors.

6. A laser device according to claim 5, wherein switching-mode power supplies are used for controlling said saturable reactors.

7. A laser device according to claim 4, wherein switching-mode power supplies are used for controlling said saturable reactors.

8. A discharge excitation gas laser device comprising:
   a gas-tight vessel;
   laser medium gas contained in said vessel;
   a pair of electrodes disposed in said vessel, said laser medium gas being excited by DC pulse discharge between said pair of electrodes; and
   a switching circuit comprising a plurality of switches comprising saturable reactors, said switching circuit for inverting the polarity of the DC pulse applied to said pair of electrodes;
   wherein one saturable magnetic core is used in common for a plurality of windings of said saturable reactors.

9. A discharge excitation gas laser device according to claim 8, wherein switching-mode power supplies are used for controlling said saturable reactors.

10. A discharge excitation gas laser device comprising:
    a gas-tight vessel;
    laser medium gas contained in said vessel;
    a pair of electrodes disposed in said vessel, said laser medium gas being excited by DC pulse discharge between said pair of electrodes; and
    a switching circuit comprising a plurality of switches comprising saturable reactors, said switching circuit for inverting the polarity of the DC pulse applied to said pair of electrodes;
    wherein switching-mode power supplies are used for controlling said saturable reactors.

* * * * *